US008246918B2

(12) United States Patent
Lopez et al.

(10) Patent No.: US 8,246,918 B2
(45) Date of Patent: Aug. 21, 2012

(54) PROPYLENE POLYMERS FOR LAB/MEDICAL DEVICES

(75) Inventors: Margarito Lopez, Pasadena, TX (US); Michael Musgrave, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 207 days.

(21) Appl. No.: 12/581,565

(22) Filed: Oct. 19, 2009

(65) Prior Publication Data

US 2010/0098586 A1    Apr. 22, 2010

Related U.S. Application Data

(60) Provisional application No. 61/107,049, filed on Oct. 21, 2008.

(51) Int. Cl.
*B01L 3/00* (2006.01)

(52) U.S. Cl. ........ 422/547; 422/549; 422/551; 422/553; 422/554; 422/556; 422/557; 422/558; 422/940; 422/942; 422/944; 422/913; 422/914; 526/351

(58) Field of Classification Search .......... 422/547–549, 422/551–559, 913–918, 940–948; 526/351
See application file for complete search history.

(56) References Cited

U.S. PATENT DOCUMENTS

| 5,516,564 | A  | * | 5/1996 | Root et al. ................ 428/35.7 |
| 5,554,668 | A  |   | 9/1996 | Scheve |
| 5,662,237 | A  | * | 9/1997 | Cain ........................ 220/368 |
| 6,231,936 | B1 | * | 5/2001 | Kozimor et al. ........... 428/34.7 |
| 7,271,209 | B2 | * | 9/2007 | Li et al. ..................... 524/284 |
| 2005/0137368 | A1 |   | 6/2005 | Weng |
| 2007/0202285 | A1 | * | 8/2007 | Burmaster et al. ........ 428/35.7 |

* cited by examiner

*Primary Examiner* — In Suk Bullock
*Assistant Examiner* — Paul Hyun

(57) ABSTRACT

Polymer compositions and articles formed therefrom are described herein. The compositions include a random copolymer and a radiation additive, wherein the random copolymer includes propylene and less than 2 wt. % ethylene and exhibits a melt flow rate of from about 30 to 100 dg/min., the polymer composition exhibits a flexural modulus of from about 160 kpsi to about 200 kpsi and the polymer composition is adapted to produce a polymer article exhibiting low plate out, a haze at 20 mils of no greater than 15%, radiation stability and autoclavability.

17 Claims, 1 Drawing Sheet

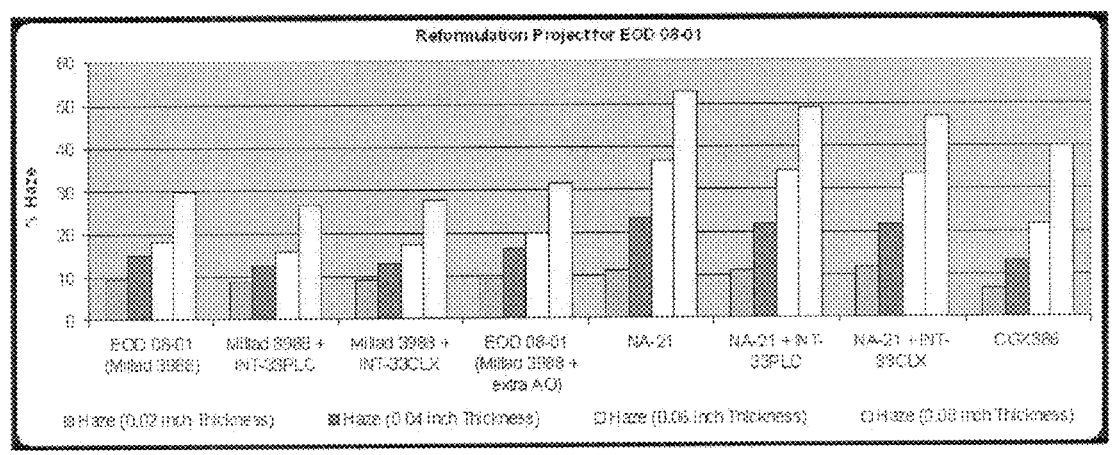

PROPYLENE POLYMERS FOR LAB/MEDICAL DEVICES

CROSS-REFERENCE TO RELATED APPLICATIONS

This application claims the benefit of U.S. Provisional Patent Application Ser. No. 61/107,049, filed Oct. 21, 2008.

FIELD

Embodiments of the invention generally relate to polypropylene compositions. In particular, embodiments of the invention relate to polypropylene compositions useful for radiation resistant applications.

BACKGROUND

Laboratory and medical grade polymer articles are typically sterilized. Such sterilization for polypropylene articles can involve gamma radiation. Accordingly, polypropylene articles subject to radiation should exhibit radiation stability. However, prior attempts to form such articles have encountered difficulties in achieving a balance of radiation resistance, clarity and flexibility, among other properties.

Accordingly, it is desirable to develop polypropylene exhibiting such balance of properties in medical and laboratory grade article formation.

SUMMARY

Embodiments of the invention generally include polymer compositions including a random copolymer and a radiation additive, wherein the random copolymer includes propylene and less than 2 wt. % ethylene and exhibits a melt flow rate of from about 300 to 100 dg/min., the polymer composition exhibits a flexural modulus of from about 160 kpsi to about 200 kpsi and the polymer composition is adapted to produce a polymer article exhibiting low plate out, a haze at 20 mils of no greater than 15%, radiation stability and autoclavability.

In one or more embodiments (in combination with any other embodiment), the polymer composition includes less than about 1% xylene solubles.

In one or more embodiments (in combination with any other embodiment), the random copolymer exhibits a melt flow rate of from about 30 dg/min. to about 60 dg/min.

In one or more embodiments (in combination with any other embodiment), the random copolymer has a melting point of from 135 to 165° C.

In one or more embodiments (in combination with any other embodiment), the polymer composition further includes an agent selected from clarifying agents, nucleating agents and combinations thereof.

In one or more embodiments (in combination with any other embodiment), the agent is selected from 1,3:2,4,-bis(3,4-dimethylbenzylidene) sorbitol; aluminum, hydroxybis[2,4,8,10-tetrakis(1,1-dimethylethyl)-6-hydroxy-12H-dibenzo[d,g][1,3,2]dioxaphoshocin 6-oxidato]; 71 (2,2'-methylenebis (2,6-di-tert-butylphenyl)phosphate lithium salt); nonitol, 1,2,3-trideoxy-4,6;5,7-bis-o-[(4-propylphenyl)methylene]; (1,3,5-Trisamide derivatives) and combinations thereof.

In one or more embodiments (in combination with any other embodiment), the radiation additive is selected from (Poly[[6-1,1,3,3,-tetramethyl butyl)amino]-s-triazine-2,4-diyl][(2,2,6,6,-tetramethyl-4-piperidyl)imino]hexamethylene {(2,2,6,6-tetramethyl-4-piperidyl)iminio)]; (4-hydroxy-2,2,6,-tetramethyl-1-piperidineethanol) and combinations thereof.

In one or more embodiments (in combination with any other embodiment), the radiation additive includes two or more radiation additives.

In one or more embodiments (in combination with any other embodiment), the composition includes from about 0.2 wt. % to about 0.15 wt. % of the radiation additive.

In one or more embodiments (in combination with any other embodiment), the composition includes from about 0.2 wt. % to about 0.4 wt. % agent.

One or more embodiments (in combination with any other embodiment) include molded articles including the polymer composition.

In one or more embodiments (in combination with any other embodiment), the molded article exhibits low plate out, a haze at 20 mils of no greater than 15%, radiation stability and autoclavability.

In one or more embodiments (in combination with any other embodiment), the random copolymer is produced with a metallocene catalyst.

In one or more embodiments (in combination with any other embodiment), the metallocene catalyst is $SiMe_2$(2-methyl-4-phenylindenyl)$_2ZrCl_2$.

In one or more embodiments (in combination with any other embodiment), the article is a medical grade article.

In one or more embodiments (in combination with any other embodiment), the medical grade article is selected from pipette tips, centrifuge tubes, reaction vessels, protein assay trays, culture tubes, syringes, petri dishes and combinations thereof.

In one or more embodiments (in combination with any other embodiment), the article has a surface tension that minimizes fluid retention in the pipette after pipetting.

In one or more embodiments (in combination with any other embodiment), the article retains no fluid after 6 passes of the fluid.

BRIEF DESCRIPTION OF THE DRAWINGS

FIG. 1 illustrates the % haze of articles produced.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

As used herein, the term "radiation stability" refers to a physical property wherein an article is formed from a polymer that is resistant to gamma radiation or electron beam radiation during sterilization in the presence of oxygen, therefore decreasing the severity of embrittlement and discoloration that normally occurs during and after such sterilization. Accordingly, as used herein, articles exhibiting radiation stability generally exhibit a resistance (no increased embrittlement or discoloration) to at least 5 mega rads $Co^{60}$ of radiation.

As used herein, the term "autoclavability" refers to a physical property wherein an article is formed from a polymer that is resistant to softening at elevated temperatures during sterilization by autoclaving, commonly at 120° C. or higher.

Certain polymerization processes disclosed herein involve contacting polyolefin monomers with one or more catalyst systems to form a polymer.

Catalyst Systems

Catalyst systems useful for polymerizing olefin monomers include any catalyst system capable of forming a polymer composition exhibiting the claimed properties. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

In one or more specific embodiments, the polymer composition is formed by a metallocene catalyst system. Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example. In one specific embodiment, the metallocene catalyst is $SiMe_2$(2-methyl-4-phenylindenyl)$_2ZrCl_2$.

Polymerization Processes

As indicated elsewhere herein, catalyst systems are used to make polyolefin compositions. Once the catalyst system is prepared, as described above and/or as known to one skilled in the art, a variety of processes can be carried out using that composition. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. No. 6,420,580. U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211, 105, U.S. Pat. No. 6,207,606, U.S. Pat. No. 6,180,735 and U.S. Pat. No. 6,147,173 may be used and are incorporated by reference herein.

The catalyst systems described above can be used in a variety of polymerization processes, over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher.

Polymerization processes may include solution, gas phase, slurry phase, high pressure processes or a combination thereof.

In certain embodiments, the process of the invention is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butane, pentene, methylpentene, hexane, octane and decane. Other monomers include ethylenically unsaturated monomers, diolefins having from 4 to 18 carbon atoms, conjugated or nonconjugated dienes, polyenes, vinyl monomers and cyclic olefins. Non-limiting monomers may include norbornene, nobornadiene, isobutylene, isoprene, vinylbenzocyclobutane, sytrnes, alkyl substituted styrene, ethylidene norbornene, dicyclopentadiene, and cyclopentene. In one embodiment, a copolymer is produced, such as propylene/ethylene, or a terpolymer is produced. Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661 and U.S. Pat. No. 5,668,228, which are incorporated by reference herein.)

The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C. Other gas phase processes contemplated by the process includes those described in U.S. Pat. No. 5,627,242, U.S. Pat. No. 5,665,818 and U.S. Pat. No. 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert. Such as hexane or isobutene.

A slurry process or a bulk process (e.g., a process without a diluent) may be carried out continuously in one or more loop reactors. The catalyst, as a slurry or as a dry free flowing powder, can be injected regularly to the reactor loop, which can itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence form removal of the diluent and all unreacted monomer and comonomers. The resulting hydrocarbon free powder can then be compounded for use in various applications. Alternatively, other types of slurry polymerization processes can be used, such stirred reactors is series, parallel or combinations thereof. Upon removal from the reactor, the polymer may be passed to a polymer recovery system for further processing, such as addition of additives and/or extrusion, for example.

Polymer Product

The polymers produced by the processes described herein may include propylene based polymers (e.g., polypropylene and polypropylene copolymers), for example. The polypropylene copolymers may include propylene-ethylene copolymers.

The polymers may have a narrow molecular weight distribution ($M_w/M_n$). As used herein, the term "narrow molecular weight distribution" refers to a polymer having a molecular weight distribution of from about 1.5 to about 8, or from about 2.0 to about 7.5 or from about 2.0 to about 7.0, for example.

In one embodiment, propylene based polymers may have a recrystallization temperature ($T_r$) of less than 130° C., or from 110° C. to 125° C., or 120° C., for example.

The propylene based polymers may have a melting point, also referred to as second melt peak, ($T_m$) (as measured by DSC) of at least 120° C., or from 120° C. to 175° C., or from 135° C. to 165° C., or from 140° C. to 150° C., for example.

The propylene based polymers may include about 15 wt. % or less, or about 12 wt. % or less, or about 10 wt. % or less, or about 6 wt. % or less, or about 5 wt. % or less or about 4 wt. % or less, or from 0.1 wt. % to 2 wt. %, or from 0.2 wt. % to about 1 wt. % of xylene soluble material (XS), for example (as measured by ASTM D5492-06).

The propylene based polymers may have a melt flow rate (MFR) (as measured by ASTM D-1238) of from 0.01 dg/min to 1000 dg/min., or from 0.01 dg/min. to 100 dg/min., or from 10 dg/min. to 60 dg/min., or from 20 dg/min. to 50 dg/min., or from 30 dg/min. to 40 dg/min. for example.

In one or more embodiments, the polymers include propylene based random copolymers. Unless otherwise specified, the term "propylene based random copolymer" refers to those copolymers composed primarily of propylene and an amount of at least one comonomer, wherein the polymer includes at least about 0.2 wt. %, or at least about 0.8 wt. %, or at least about 2 wt. %, or from about 0.1 wt. % to about 5.0 wt. %, or from about 0.4 wt. % to about 1.0 wt. % comonomer relative to the total weight of polymer, for example.

The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

The propylene based random copolymers may exhibit a melt flow rate of at least 2 dg./10 min., or from 5 dg./10 min. to 60 dg./10 min. or from 10 dg./10 min. to 50 dg./10 min., or from 20 dg/min. to 45 dg/min., or from 30 dg/min. to 40 dg/min., for example.

Product Application

The polymers produced are useful in a variety of end-use applications, such as molded articles. More particularly, the polymers can be used for laboratory and medical end-use articles, such as pipette tips and centrifuge tubes.

In one embodiment, the polymer is used to form a molded article, such as, a medical or laboratory grade article. For example, the molded article may include, but is not limited to, a pipette tip, centrifuge tube, reaction vessel, protein assay trays, syringe, petri dish or culture tube. The molded article may be produced using any method known to those of ordinary skill in the art, such as blow molding, compression molding, injection stretch blow molding, etc.

In order to modify or enhance certain properties of the molded articles for specific end-uses, it is possible for the polymer to contain appropriate additives in effective amounts to form a polymer composition. In one embodiment, the additive is a radiation additive which provides radiation resistance during the sterilization process of the molded article. Examples of such additives include Chimmasorb 944 and Tinuvin 622 (commercially available from Ciba), and other such similar additives, such as hindered amines and oligomeric hindered amines. The additives may be combined with the polymer during the processing phase (pellet extrusion), for example. It is further contemplated that multiple radiation additives may be used in combination. The total amount of radiation additive may be added in an amount less than 0.25 wt %, or from 0.05 wt % to 0.20 wt. %, or from 0.1 wt. % to 0.15 wt. %, based on the total weight of the polymer.

Other additives may include stabilizers (e.g., hindered amines, benzofuranon, indolinone) to protect against UV degradation, thermal or oxidative degradation and/or actinic degradation, anti-blocks, coefficient of friction modifiers, processing aids, colorants, clarifiers, nucleators, and other additives known to those skilled in the art. In one embodiment, the additives which are useful are those that are not surface active additives or that do not migrate to the surface of the polymer or article. Examples of such additives, such as clarifiers and nucleators, include, but are not limited to, Millad® 3988, Millad® NX8000 (commercially available from Milliken Chemicals), ADK NA-21 and ADK NA-71 (commercially available from Amfine Chemicals), and CGX386 (commercially available from Ciba). More generally, clarifiers may include inorganic nucleating agents (pulverized clay, silicates, alkali salts, alkaline earth salts, aluminum salts, titanium salts, and metal oxides, for example), organic nucleating agents (2-mercaptobenzimidazole, sorbitol derivatives, and phosphate derivates, for example), and 1,3,5-trisamide derivatives. Clarifiers may be added in the range of from 0.10 wt % to 0.4 wt %, or from 0.15 wt % to 0.25 wt %, for example. Processing aids, such as Irgafos 168 (available from Ciba) and others known to those skilled in the art, may be added in the range of from 0.05 wt % to 0.20 wt. %, or from 0.1 wt. % to 0.15 wt. %, for example.

Unexpectedly, the articles formed herein exhibit a balance of properties prior attempts were unable to achieve. For example, the articles formed herein (a single article) are able to achieve a desirable flexibility (as measured by flexural modulus), low plate-out, desirable haze, radiation stability and autoclavability, within the same composition.

The molded article may exhibit a haze for a thickness of 2 mils. of less than 15%, or from 2% to 10% or from 5% to 8%, for example. The molded article may exhibit a haze for a thickness of 4 mils. of less than 20%, or from 5% to 18% or from 10% to 15%, for example. The molded article may have exhibit a haze for a thickness of 6 mils. of less than 25%, or from 10% to 20% or from 15% to 18%, for example. The molded article may exhibit a haze for a thickness of 8 mils. of less than 40%, or from 10% to 35% or from 20% to 30%, for example. Haze was measured following the procedures of ASTM D1003, procedure "A".

In one embodiment, the molded article is radiation resistant (i.e., exhibits radiation stability), as described in the definition section. In one embodiment, the molded article has autoclavability, as described in the definition section. In one embodiment, the article exhibits a surface tension which prevents liquid from adhering to the article. In one embodiment, the article is a pipette tip and the pipette tip retains only small drops of fluid at the tip of the article after 2 passes of the fluid, or 3 passes, or 4 passes, or 6 passes, for example. Alternatively, the article retains no fluid at the tip of the article after 2 passes of the fluid, or 3 passes, or 4 passes, or 6 passes, for example.

As used herein, "surface tension" is measured via a water retention test. The water retention test demonstrates the efficiency of a pipette tip to completely dispense all the liquid from the pipette tip without having any liquid remaining attached to the inside wall of the tip. The water retention test involves multiple pipetting of distilled water. The number of pipette passes is defined as the number of times that the distilled water is dispensed from the pipette tip. Each time the water is dispensed from the pipette tip, the pipette tip is visually inspected for water retention. For consistency, the pipette tip from the same core in the mold is used for the test.

The molded article may exhibit resistance to plate-out. Plate-out occurs when material deposits on the mold (cores, cavities, or vents) during the molding of a part. The residue that deposits onto the mold is also referred to as plate-out. In one embodiment, the article has low plate-out, alternatively the article has medium plate-out, or alternatively, the article has no plate-out, under normal or aggressive molding conditions.

The molded article may have a room temperature notched Izod impact strength value of from 0.10 to 0.50 ft-lb./in., or from 0.15 to 0.40 ft-lb./in., or from 0.20 to 0.35 ft-lb./in., for example.

The molded article may exhibit a flexural modulus of from 100 to 350 kpsi, or from 150 to 300 kpsi, or from 200 to 250 kpsi, or from 160 to 200 kpsi, for example.

EXAMPLES

A 40-melt flow rate ethylene/propylene random copolymer polypropylene (Example A) was produced with the metallocene catalyst system $SiMe_2(2\text{-methyl-4-phenylindenyl})_2ZrCl_2$. A 40-melt flow rate ethylene/propylene random copolymer polypropylene (Example B) was produced with the same metallocene catalyst system as Example A. Example A had an ethylene content of 0.5 wt % and Example B had an ethylene content of 1.0 wt %. Example A and B were formulated for laboratory and medical devices with high clarity, good toughness, and resistant to typical levels of gamma radiation used to sterilize polypropylene. Table 1 provides Example A's characteristics.

TABLE 1

| Example A Characteristics | |
| --- | --- |
| Melt Flow (grams/10 min.) | 40 |
| Xylene Solubles (weight %) | 0.5 |
| Ethylene, weight % | 0.5 |
| DSC Melt Point deg. C. | 152 |

Comparative Example 1 was a clarified metallocene catalysed homopolymer. As can be seen in Table 2, the higher melt flow rate of Example A over Comparative Example 1 should allow for increase of the flow behaviour of the polymer in order to fill the multi-cavity pipette tip mold.

The physical properties for Example A are provided in Table 2 below. As is indicated in Table 2, Example A has improved clarity over Comparative Example 1 and has a similar Flexural Modulus but a higher notched Izod impact value. Example A shows improved haze properties and a higher melt flow rate over Comparative Example 1.

TABLE 2

Comparison of Properties of Comparative Example 1 and Example A.

| | Comparative Example 1 | Example A |
| --- | --- | --- |
| Melt Flow Rate (g/10 min.) | 23 | 46 |
| Second Melt Peak (° C.) | 152 | 150 |
| Flex Modulus (Chord 4-8N) kpsi | 233 | 241 |
| Break Type-Notched | Complete Break | Complete Break |
| Izod Impact-Notched (ft-lb/in) | 0.28 | 0.31 |
| Tensile Modulus (psi) | 293549 | 253,666 |
| Tensile Strength @ Yield (psi) | 5599 | 5252 |
| Elongation @ Yield (%) | 5.3 | 5.7 |
| Tensile Strength @ Break (psi) | 2920 | 2929 |
| Elongation @ Break (%) | 277 | 320 |
| Second Melt Second Peak (° C.) | | 141.1 |

Table 3 provides a comparison of the physical properties of the comparative example and Example A. As can be seen in Table 3, Example A provides for good clarity while providing a balance of toughness and radiation resistance.

TABLE 3

Comparison of Properties of Comparative Example 1 and Example A.

| | | Comp. Ex. 1 | Example A |
|---|---|---|---|
| MELT_FLOW | Melt Flow Rate | 23 | 46 |
| DSC_MELT | Recrystallization Peak | 123 | 120 |
| | Delta H_Recrystallization | 94 | 93 |
| | Second Melt Peak | 155 | 150 |
| | Delta H_Second Melt | 102 | 100 |
| PP_FLEX_INSTRON | Flex Modulus (Chord 4-8N) | 233 | 241 |
| PP_TENSILE_BARS | Tensile Modulus | 293549 | 253,666 |
| | Tensile Strength @ Yield | 5599 | 5252 |
| | Elongation @ Yield | 5.3 | 5.7 |
| | Elongation @ Break | 277 | 320 |
| | Tensile Strength @ Break | 2920 | 2929 |
| IZOD | Break Type-Notched | Complete Break | Complete Break |
| | Izod Impact-Notched | 0.28 | 0.31 |
| HAZE_PLAQUES | Haze (0.02 inch Thickness) | 11.8 | 6.0 |
| | Haze (0.04 inch Thickness) | 27.4 | 14.3 |
| | Haze (0.06 inch Thickness) | 43.7 | 16.3 |
| | Haze (0.08 inch Thickness) | 51.8 | 28.3 |
| INSTRUM_IMPACT | Impact Velocity | | 28 |
| | Impact Energy | | 88 |
| | Maximum Load | | 265 |
| | Energy to Max Load | | 3.2 |
| | Energy After Max Load | | 0.2 |
| | Total Energy | | 3.4 |
| | Temperature | | 72 |
| | Ductile/Brittle Failures | | 0/5 |

In order to address additional processing concerns, other processing aids were added to Example A. Additives included AUK NA-21 (available from Amfine), CGX 386 (available from Ciba), and Millad® 3988, available from Milliken. Samples were compounded comprising these additives individually and in combinations, and then molded for test specimens. Percent Haze associated with these samples are illustrated in FIG. 1. Table 4 presents the DSC results for the samples.

ADK NA-21 and CGX386 nucleators showed lower recrystallization temperatures of 116.7° C. and 115.3° C. respectively. Addition of the processing aids to the samples with the ADK NA-21 nucleator showed an increase of recrystallization temperatures up to 118.3° C. (with INT-33CLX), which would indicate that dispersion of the nucleator ADK NA-21 slightly increased in the polymer melt.

Three types of polypropylene pipette tips were tested for water retention: Example B; Example A; and Example C; a

TABLE 4

DSC Results for Example A with Processing Aids.

| All comprise Example A | Millad 3988 | Millad 3988 + processing aid 1 | Millad 3988 + processing aid 2 | Millad 3988 + extra anti-oxidant | NA-21 | NA-21 + processing aid 1 | NA-21 + processing aid 2 | CGX386 |
|---|---|---|---|---|---|---|---|---|
| Recrystallization Peak (° C.) | 120.9 | 120.4 | 120.1 | 120.5 | 116.7 | 117.7 | 118.3 | 115.3 |
| Delta H_Recrystallization (J/g) | 94.9 | 94.2 | 94.7 | 96.7 | 95.4 | 92.1 | 92.5 | 95.8 |
| Second Melt Peak (° C.) | 149.4 | 149.4 | 149.3 | 149.3 | 148.5 | 148.3 | 148.7 | 148.2 |
| Delta H_Second Melt (J/g) | 102.1 | 99.2 | 100.2 | 101.7 | 100.9 | 97.5 | 98.4 | 101.1 |
| % Crystallinity | 48.9 | 47.4 | 47.9 | 48.7 | 48.3 | 46.6 | 47.1 | 48.4 |
| Second Melt Second Peak (° C.) | 139.7 | 139.7 | 139.7 | 139.4 | 139.4 | 138.4 | 139.7 | 139.2 |

The results show that the addition of the processing aids does not increase % haze. The ADK NA-21 nucleator showed a slight increase of % haze compared the Example A. The CGX386 showed a slight decrease in % haze on the 0.02-inch thickness section: however, for the thicker sections, a slight increase on % haze was obtained. All the samples showed a melting temperature consistent with Example A (148° C. to 149° C.). The samples prepared with Millad® 3988 (with and without the processing aids) exhibited high recrystallization temperatures of about 120° C., which is consistent with well-dispersed nucleation sites. The samples prepared with the Zigler-Nata random copolymer polypropylene with 0.6 wt % $C_2$, available from Total Petrochemicals USA, Inc.

The results for the water retention test revealed that all the pipette tips produced with Example C exhibited water retention. In general, the pipette tips from polypropylene produced with metallocene technology did not show water retention using the sorbitol clarifiers Millad® 3988, NX8000 or a combination of Millad® 39988 with NA-21. Table 5 provides the results of the water retention test.

TABLE 5

Water Retention Test

| Sample | Base Resin Type | Clarifier Type | # of Pipette Passes | Notes |
|---|---|---|---|---|
| 1 | Example B | Millad 3988 (500 ppm) + NA-21 (1500 ppm) | 6 | No water retention |
| 2 | Example A | Millad 3988 (1900 ppm) | 6 | No water retention |
| 3 | Example B | Millad 3988 (1900 ppm) | 6 | Small drops at the tip |
| 4 | Example B | NX8000 (1900 ppm) | 6 | No water retention |
| 5 | Example B | CGX 386 (200 ppm) | 2 | Small drops at the tip |
| 6 | Example B | NX8000 (1300 ppm) | 4 | No water retention |
| 7 | Example C | Millad 3988 (1900 ppm) | 1 | Small drops at the tip |
| 8 | Example C | Millad 3988 (500 ppm) + NA-21 (1500 ppm) | 3 | Small drops at the tip |
| 9 | Example C | NX8000 (1900 ppm) | 6 | Small drops at the tip |

The pipette tips from polypropylene produced with metallocene technology in combination with CGX 386 exhibited water retention on the $2^{nd}$ pass. At 1900 ppm loading, the NX 8000 clarifier did not show any water retention compared to the Millad® 3988, even after six passes. Lowering the amount of NX 8000 to 1300 ppm showed water retention on the fourth pass of the test.

In order to determine the resistance of the polymer articles to plate-out, aggressive molding conditions were used in order to promote plate-out. The normal (or regular) and aggressive conditions are shown in Table 6.

TABLE 6

Regular and Aggressive molding conditions.

| | Regular Molding Condition | Molding Conditions to Promote Plate-Out |
|---|---|---|
| Melt Temperature (° C.) | 232 | 260 |
| Cycle Time (s) | 14 | 10.5 |
| Max injection pressure (psi) | 10500 | 7480 |
| Max holding pressure (psi) | 120000 | 9295 |
| Cushion (mm) | 1.7 | 1.2 |
| Mold temp (stationary) (° C.) | 4.4 | 4.4 |
| Mold temp (moving) (° C.) | 4.4 | 4.4 |
| Injection time (s) | 0.61 | 0.56 |
| Injection speed (mm/s) | 50 | 50 |
| Extruder Temp (° C.) | 204, 215, 221, 232, 243 | 223, 232, 251, 251, 260 |
| Hot runner Temp (° C.) | 243 | 260 |

Three types of base resins were studied for plate-out purposes, Example A, Example B, and Example C. Table 7 provides the formulation and properties of the samples studied. Table 7. Base Resins for Plate-out Study.

TABLE 7

| Sample | 7 | 8 | 9 | 10 | 11 | 3 | 4 | 5 | 6 | 2 | 1 |
|---|---|---|---|---|---|---|---|---|---|---|---|
| Base Resin Type | Example C | Example C | Example C | Example C | Example C | Example B | Example B | Example B | Example B | Example A | Example B |
| Ethylene, weight % | 0.6 | 0.6 | 0.6 | 0.6 | 0.6 | 1.0 | 1.0 | 1.0 | 1.0 | 0.5 | 1.0 |
| CaSt (%) | 0.09 | 0.05 | 0 | 0 | 0 | 0.09 | 0 | 0 | 0 | 0.09 | |
| Tinuvin 622 (%) | 0.05 | 0.08 | 0.08 | 0.08 | 0.08 | 0.05 | 0.08 | 0.08 | 0.08 | 0.05 | 0.08 |
| Millad 3988 (%) | 0.19 | 0.05 | 0 | 0 | 0 | 0.19 | 0 | 0 | 0 | 0.19 | 0.05 |
| Chimmasorb 944 (%) | 0.1 | 0.04 | 0.04 | 0.04 | 0.04 | 0.1 | 0.04 | 0.04 | 0.04 | 0.10 | 0.04 |
| Irgafos 168 (%) | 0.05 | 0.1 | 0.1 | 0.1 | 0.1 | 0.05 | 0.1 | 0.1 | 0.1 | 0.05 | 0.1 |
| Amline NA-21 (%) | 0 | 0.15 | 0 | 0 | 0 | 0 | 0 | 0 | 0 | | 0.15 |
| DHT-4V (%) | 0 | 0.02 | 0.02 | 0.02 | 0.02 | 0 | 0.02 | 0.02 | 0.02 | | 0.02 |
| NX8000 (%) | 0 | 0 | 0.19 | 0.13 | 0 | 0 | 0.19 | 0 | 0.13 | | |
| CGX 386 (%) | | | | | 0.02 | | | 0.02 | | | |
| Trigonox 301(ppm) | 980 | 980 | 980 | 980 | 980 | | | | | | |
| Starting MF | 2.8 | 2.8 | 2.8 | 2.8 | 2.8 | | | | | | |
| Pellet MFR Target | 40 | 40 | 40 | 40 | 40 | 40 | 40 | 40 | 40 | 40 | 40 |

Example B: Random Copolymer Polypropylene with 1.0 wt % C2 produced with metallocene catalyst technology
Example A: Random Copolymer Polypropylene with 0.5 wt % C2 produced with metallocene catalyst technology
Example C: Random Copolymer Polypropylene with 0.6 wt % C2 produced with Ziegler-Natta catalyst technology Table 8 provides the plate-out results of the study.

TABLE 8

Pipette Tip Mold Study Mold Plate Out

| Sample | Resin Type | Mold Plate Out |
|---|---|---|
| 2 | Example A + Millad ® 3988 (1900 ppm) | High |
| 1 | Example B + Millad ® 3988 (500 ppm) + NA-21 (1500 ppm) | None |
| 7 | Example C + Millad ® 3988 (1900 ppm) | Low |
| 8 | Example C + (500 ppm Millad ® 3988 + 1500 ppm NA-21) | Low |
| 9 | Example C + NX 8000 (1900 ppm) | High |
| 10 | Example C + NX 8000 (1300 ppm) | Medium |
| 11 | Example C + CGX 386 (200 ppm) | Low |
| 3 | Example B + Millad ® 3988 (1900 ppm) | Medium |
| 4 | Example B + NX 8000 (1900 ppm) | None |
| 5 | Example B + CGX 386 (200 ppm) | None |
| 6 | Example B + NX 8000 (1300 ppm) | None |

Example B: Random Copolymer Polypropylene with 1.0 Wt % C$_2$ produced with metallocene catalyst technology
Example A: Random Copolymner Polypropylene with 0.5 Wt % C$_2$ produced with metallocene catalyst technology
Example C: Random Copolymer Polypropylene with 0.6 Wt % C$_2$ produced with Ziegler-Natta catalyst technology
Level of plate out (none, low, medium, high) is measured by visual inspection and is recognized by one skilled in the art.

Table 9 summarizes the plate-out and water retention studies of the pipettes along with the YI Index and Haze.

TABLE 9

Pipette Tip Mold Study Summarized Results

| Product | Discription | Mold Plate Out | Water Retention | YI Index | % Haze (40 mils) |
|---|---|---|---|---|---|
| 1 | Example B + Millad ® 3988 (500 ppm) + NA-21 (1500 ppm) | No | No | −6.36 | 16 |
| 2 | Example A + Millad ® 3988 (1900 ppm) | Yes | No | | |
| 3 | Example B + Millad ® 3988 (1900 ppm) | Yes | Yes | −2.35 | |
| 4 | Example B + NX 8000 (1900 ppm) | No | No | −5.93 | 13 |
| 5 | Example B + CGX 386 (200 ppm) | No | Yes | 0.98 | 16 |
| 7 | Example C + Millad ® 3988 (1900 ppm) | Yes | Yes | −3.04 | |
| 8 | Example C + (500 ppm Millad ® 3988 + 1500 ppm NA-21) | Yes | Yes | −1.04 | |
| 9 | Example C + NX 8000 (1900 ppm) | Yes | Yes | −6.12 | |

All the formulations with Example C did not show improvement over Example B with regard to mold plate out and water retention. NX8000 clarifier showed similar performance in mold plate out, water retention, and Yellow Color Index (YI Index) compared to the existing Example B. The NX8000 formulation exhibited the best overall performance with regards to processability, functional performance, and appearance. The YI Index was measured by the Hunter Color Analysis method using a Hunter Lab D25 optical sensor.

While embodiments have been shown and described, modifications thereof can be made by one skilled in the art without departing from the spirit and teachings of the disclosure. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A polymer composition comprising a random copolymer and a radiation additive, wherein the random copolymer comprises propylene, a melting point of from 140 to 150° C., and less than 2 wt. % ethylene and exhibits a melt flow rate of from about 30 to 100 dg/min., the polymer composition exhibits a flexural modulus of from about 160 kpsi to about 200 kpsi and the polymer composition is adapted to produce a polymer article exhibiting low plate out, a haze at 20 mils of no greater than 15%, radiation stability and autoclavability.

2. The composition of claim 1, wherein the polymer composition comprises less than about 1% xylene solubles as measured by ASTM D5492-06.

3. The composition of claim 1, wherein the random copolymer exhibits a melt flow rate of from about 30 dg/min. to about 60 dg/min.

4. The composition of claim 1 further comprising an agent selected from clarifying agents, nucleating agents and combinations thereof.

5. The composition of claim 4, wherein the agent is selected from 1,3:2,4,-bis(3,4-dimethylbenzylidene) sorbitol; aluminum, hydroxybis[2,4,8,10-tetrakis(1,1-dimethylethyl)-6-hydroxy-12H-dibenzo[d,g-][1,3,2]dioxaphoshocin 6-oxidato]; 71 (2,2'-methylenebis(2,6-di-tert-butylphenyl) phosphate lithium salt); nonitol, 1,2,3-trideoxy-4,6;5,7-bis-o-[(4-propylphenyl)methylene]; (1,3,5-Trisamide derivatives) and combinations thereof.

6. The composition of claim 4, wherein the composition comprises from about 0.2 wt. % to about 0.4 wt. % agent.

7. The composition of claim 1, wherein the radiation additive is selected from (Poly[[6-[1,1,3,3,-tetramethyl butyl) amino]-s-triazine-2,4-diyl][(2,2,6,6,-tetramethyl-4-piperidyl)imino]hexamethylene {(2,2,6,6-tetramethyl-4-piperidyl)iminio)]; (4-hydroxy-2,2,6,-tetramethyl-1-piperidineethanol) and combinations thereof.

8. The composition of claim 1, wherein the radiation additive comprises two or more radiation additives.

9. The composition of claim 1, wherein the composition comprises from about 0.2 wt. % to about 0.15 wt. % of the radiation additive.

10. The composition of claim 1, wherein the random copolymer is produced with a metallocene catalyst.

11. The composition of claim 10, wherein the metallocene catalyst is $SiMe_2$(2-methyl-4-phenylindenyl$_2$ZrCl$_2$.

12. A molded article comprising the composition of claim 1.

13. The molded article of claim 12, wherein the molded article exhibits low plate out, a haze at 20 mils of no greater than 15%, radiation stability and autoclavability.

14. The article of claim 12, wherein the article is a medical grade article.

15. The medical grade article of claim 14, wherein the medical grade article is selected from pipette tips, centrifuge tubes, reaction vessels, protein assay trays, culture tubes, syringes, petri dishes and combinations thereof.

16. The article of claim 12, wherein the article is a pipette tip having surface tension that minimizes fluid retention in a pipette after pipetting.

17. The article of claim 16, wherein the article retains no fluid after 6 passes of the fluid.

* * * * *